US011701625B2

(12) United States Patent
Vandegrift

(10) Patent No.: US 11,701,625 B2
(45) Date of Patent: Jul. 18, 2023

(54) MULTIPLE-VENTURI NOZZLE, SYSTEM, METHOD OF MANUFACTURE AND METHOD OF USE

(71) Applicant: Gideon Vandegrift, Sarasota, FL (US)

(72) Inventor: Gideon Vandegrift, Sarasota, FL (US)

( * ) Notice: Subject to any disclaimer, the term of this patent is extended or adjusted under 35 U.S.C. 154(b) by 0 days.

(21) Appl. No.: 17/308,742

(22) Filed: May 5, 2021

(65) Prior Publication Data

US 2022/0355254 A1    Nov. 10, 2022

(51) Int. Cl.
  *B01F 25/312*  (2022.01)
  *B33Y 10/00*   (2015.01)
  *B33Y 80/00*   (2015.01)

(52) U.S. Cl.
  CPC .. *B01F 25/31242* (2022.01); *B01F 25/31232* (2022.01); *B33Y 10/00* (2014.12); *B33Y 80/00* (2014.12)

(58) Field of Classification Search
  CPC ......... B01F 25/31242; B01F 25/31232; B33Y 10/00; B33Y 80/00
  See application file for complete search history.

(56) References Cited

U.S. PATENT DOCUMENTS

| 2,760,371 | A | 8/1956 | Borden |
| 2,797,904 | A | 7/1957 | Voorheis |
| 4,123,800 | A | 10/1978 | Mazzei |
| 4,966,001 | A | 10/1990 | Beebe |
| 7,854,637 | B2 | 12/2010 | Schultz |
| 10,293,443 | B1 * | 5/2019 | Ekhoff ................. H05K 3/0047 |
| 2003/0178732 | A1 | 9/2003 | Luman |
| 2010/0252652 | A1 | 10/2010 | Johnson et al. |
| 2011/0083439 | A1 | 4/2011 | Zuo et al. |

(Continued)

FOREIGN PATENT DOCUMENTS

| CN | 202492409 U | 8/2011 |
| CN | 203869853 U | 5/2014 |

(Continued)

OTHER PUBLICATIONS

International Search Report and Written Opinion in PCT/US2022/028661 dated Jan. 18, 2023, 21 pages.

*Primary Examiner* — Rick K Chang
(74) *Attorney, Agent, or Firm* — Dinsmore & Shohl LLP

(57) ABSTRACT

The instant invention includes a multiple-Venturi nozzle. The instant multiple-Venturi nozzle has a generally cylindrical body with a generally flat bottom surface and a generally flat distal outer surface and a generally arcuate vertical surface parallel to the bottom and outer surfaces. The instant multiple-Venturi nozzle further includes a plurality of chokes generally perpendicular to the bottom and outer surfaces, each of said chokes extending through the body and having a choke inlet and a choke outlet. The instant multiple-Venturi nozzle further includes a manifold extending from the outer surface partially into the body and a plurality of manifold channels connecting the manifold to each choke, each of said manifold channels being generally perpendicular to a corresponding choke, having a manifold outlet and a distal manifold inlet and being offset in a helical distribution from other manifold outlets corresponding to the same choke.

8 Claims, 9 Drawing Sheets

(56) References Cited

U.S. PATENT DOCUMENTS

| | | | |
|---|---|---|---|
| 2013/0186972 A1* | 7/2013 | Petrovic | B05B 15/652 239/11 |
| 2013/0327720 A1* | 12/2013 | McGuire | B01F 33/5021 210/748.03 |
| 2014/0116217 A1* | 5/2014 | Hashish | B26F 1/26 83/177 |
| 2015/0113993 A1* | 4/2015 | Rudrapatna | B22F 10/20 419/53 |
| 2018/0043319 A1 | 2/2018 | Schneider et al. | |
| 2018/0058388 A1 | 3/2018 | Zhang et al. | |
| 2018/0111104 A1* | 4/2018 | Gautam | B29B 13/06 |
| 2019/0107005 A1* | 4/2019 | Kulkarni | B08B 3/003 |
| 2020/0206700 A1 | 7/2020 | Seal | |
| 2020/0309378 A1* | 10/2020 | Dam | F23R 3/346 |

FOREIGN PATENT DOCUMENTS

| | | |
|---|---|---|
| EP | 2216599 A2 | 8/2010 |
| GB | 2439380 A | 12/2007 |

\* cited by examiner

MULTIPLE-VENTURI NOZZLE, SYSTEM, METHOD OF MANUFACTURE AND METHOD OF USE

BACKGROUND OF THE INVENTION

First discovered by the Italian physicist Giovanni Battista Venturi in 1797, the "Venturi effect" is the name for a natural phenomenon that sees a reduction in fluid pressure when a fluid flows through a constricted section (or choke) of a pipe. In an idealize state, incompressible fluid's: (a) velocity must increase as it passes through a constriction under the principle of mass continuity; and (b) static pressure must decrease as it passes through a constriction under the principle of conservation of mechanical energy (i.e., Bernoulli's principle). Put another way, any "gain" in kinetic energy a fluid attains by its increased velocity through a constriction is balanced by a "drop" in pressure.

The Venturi effect has a number of practical applications wherein a Venturi nozzle takes advantage of the above-mentioned pressure drop to mix gas and liquid; including: aerators, atomizers, and carburetors. In the case of mixing oxygen into water, a Venturi microbubble generator can be used to create a large number of very small bubbles; accomplishing several things. First, the size of the bubbles allows such bubbles to remain suspended in the water for longer periods—increasing the amount of oxygen which will dissolve into the water. Second, the small sized bubbles have a very high surface area to volume ratio—increasing the amount of oxygen which will dissolve into the water by increasing the total effective surface area of air in contact with water.

Historically, various attempts were made to use more than one Venturi nozzle in combination with one another. One such attempt is disclosed in UK Patent Application GB2439380A (Priest) which teaches an aeration apparatus which makes use of the Venturi effect.

Another such attempt is disclosed in CN 202492409U (Jia) which teaches a Venturi-type radial jet aerator which makes use of more than one Venturi nozzle.

Another such attempt is disclosed in U.S. Pat. No. 4,966,001 (Beebe) which teaches a multiple Venturi tube gas fuel injector for a catalytic combustor.

Another such attempt is disclosed in U.S. Pat. No. 7,854,637 (Schultz) which teaches a multiple Venturi nozzle system for watercraft.

Another such attempt is disclosed in U.S. Pat. No. 2,797,904 (Voorheis) which teaches a multiple Venturi air scrubber.

Another such attempt is disclosed in U.S. Pat. No. 2,760,371 (Borden) which teaches a multiple Venturi tube.

Another such apparatus for exploring oxygenation effect of multiple Venturi air ejectors CN203869853U (Xiangju) which discloses a test apparatus for exploring the oxygenation effect of multiple Venturi air ejectors.

SUMMARY OF THE INVENTION

The primary object of the present invention is directed to a Multiple-Venturi Nozzle ("MVN") apparatus having: (a) a plurality of Venturi nozzles spaced around a central recess; (b) the central recess having oxygen lines to each of the Venturi nozzles so that a fluid passed through the MVN is mixed with a gas which flows out of the central recess through the oxygen lines—forming small bubbles. This increases the quantity of gas bubbles and reduces the size of gas bubbles (allowing for better dissolution of the gas into the liquid than traditional Venturi nozzles).

Importantly, many conventional Venturi systems have a relatively high liquid/gas mixture velocity at the nozzle-outlet. This can limit the usefulness of such Venturi systems for many applications including the use of such systems in aquaculture or agricultural projects (e.g., hydroponics, aquaponics, etc.) since the high velocity can damage plant (especially root structures) and marine life. The instant invention allows for a lower exit flow rate by making use of: (a) multiple Venturi nozzles; and (b) the plurality of oxygen lines.

An additional object of the present invention is directed to an MVN with a plurality of chokes, manifold outlets, manifold channels and manifold inlets (as defined in the "Detailed Description" section below) in a generally helical structure (i.e., the distribution of manifold outlets is made in a corkscrew like pattern). This allows for: (a) the placement of Venturi nozzles in "layers" such that the gas inlet is perpendicular to the flow of the fluid; and (b) a far greater density of Venturi nozzles than has ever been possible before. By heaving each of the manifold channels offset from one another, the space between each "layer" can be made thinner, i.e., less material can be used to construct the MVN and a greater effective density of Venturi nozzles can be obtained for a given "width" of the MVN.

The number of Venturi nozzles in each "layer" is controlled by the number of chokes contained in each such layer (to which there is no theoretical limit). Moreover, such number of Venturi nozzles increases linearly with the number of "layers" which are present. This is only limited by the materials used and the manufacturing techniques employed to separate each "layer". To maximize the number of chokes in any given layer, additional manifold rings and manifold passages can be used as illustrated herein.

Indeed, the device shown in the drawings (e.g., FIGS. 3A through 3L) has been actually prototyped and tested. This device has thirteen (13) chokes each of which has at least nine (9) oxygen lines. Thus, each device has the effective capacity of at least 117 (i.e., 13×9) Venturi nozzles. In the prototyping done thus far, such device is approximately one inch in diameter. This high effective "density" of Venturi nozzles in such a small device has yielded unexpected results. Experimentation has shown that the use of an MVN in connection with oxygenating water allows for a greater rate of oxygen dissolution (i.e., a better rate of oxygenation of the water) using a less powerful pump as compared with traditional Venturi aerators. In another embodiment, a plurality of manifolds could be used—thus allowing the MVN to simultaneously draw more than one gas into the liquid stream passing through the chokes. For example, in a two-manifold MVN system, a first gas and a second gas could be simultaneously diffused into a single stream of liquid using only one pump for such liquid. This has particular application in waste-water treatment applications where multiple gasses may be diffused into waste water at a given time.

An additional object of the present invention is directed to a system containing: (a) at least one MVN; and (b) a pipe; and (c) a gas line. More specifically, the instant invention includes a system in which a plurality of MVNs are used in an external manifold to increase the effective flow rate and the effective gas dissolution rate within such a system. For example, a one to four external manifold could be used in connection with four MVNs (one at each outlet of the external manifold). By doing say, the fluid flow rate at each of the external manifold's outlets would be one fourth the flow rate at the external manifold's inlet. Such a system can be used as a preliminary means of "stepping down" the flow of fluids.

An additional object of the present invention is directed to a method of manufacturing an MVN using three-dimensional ("3D") printing technology. More specifically, because of: (a) the plurality of gas lines (also called "manifold channels" herein); and (b) the generally helical structure of such manifold channels; the most effective way to construct an MVN is through the use of 3D printers. Thus, the size of each hole (i.e., manifold channel) can be made as small as the minimum thickness of material which a given 3D printer can extrude (often fractions of a millimeter). In the preferred embodiment, each manifold channel is offset both vertically and at a slight angle to the horizontal—resulting in a helical distribution of manifold channels. This is done to add further strength and to ensure that the pressure through each manifold channel does not result in a deformation of the material or a breach from one manifold channel to another. As illustrated in the figures below and as borne out by experimentation, this allows for creating an MVN with any desired number of Venturi or any desired flow/dissolution characteristics. Thus, for example, an MVN can be made with relatively few chokes for a low-flow rate application or with relatively many chokes for a higher-flow rate application.

An additional object of the present invention is directed to a method of using an MVN. As discussed elsewhere herein, the MVN is connected within an outer housing (e.g., a pipe) and a liquid (or a gas) is passed through same (through the chokes). A second liquid or gas is fed to a manifold within the MVN and drawn through the plurality of holes. Where a gas is diffused into a liquid, a micro-cavitation of the gas occurs —resulting in a high rate of dissolution of the gas into the liquid.

BRIEF DESCRIPTION OF THE DRAWINGS

In the following detailed description, reference will be made to the attached drawings in which.

REFERENCE NUMERAL CHART

Figure 1A:
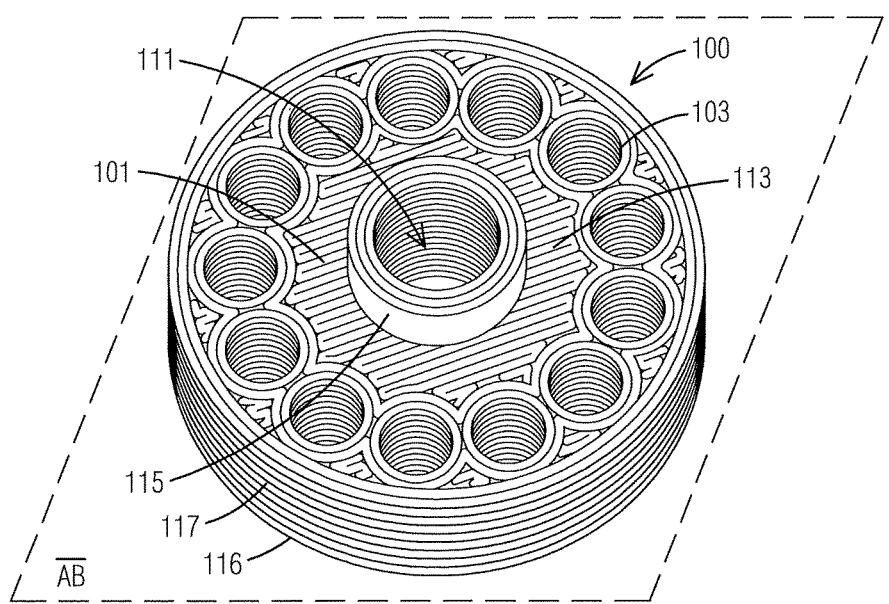
FIG. 1A is a top perspective view of an MVN having at least one choke and a manifold.

For purposes of describing the preferred embodiment, the terminology used in reference to the number components in the drawings is as follows:

| | |
|---|---|
| 100 | Multiple-Venturi Nozzle ("MVN") |
| 101 | Medium |
| 103 | Choke |
| 103a | Choke Inlet |
| 103b | Choke Outlet |
| 105 | Manifold Outlet |
| 107 | Manifold Channel |
| 109 | Manifold Inlet |
| 111 | Manifold |
| 113 | Outer Surface |
| 115 | Manifold Nipple |
| 116 | Bottom Edge |
| 117 | Vertical Surface |
| 118 | Bottom Surface |
| 119 | Manifold Back |
| 121 | Pipe |
| 123 | Manifold Ring |
| 125 | Manifold Passage |
| $P_{1A}$ | Initial Pressure |
| $P_{1B}$ | Choke Pressure |
| $P_{1C}$ | Final Pressure |
| $P_2$ | Second Pressure |

DETAILED DESCRIPTION OF THE INVENTION

FIG. 1A is a top perspective view of an MVN 100 having at least one Choke 103 and a Manifold 111. In the embodiment shown in FIG. 1A, there are a plurality of Chokes 103. The MVN 100 is then inserted into the end of a pipe or other conduit (not shown in FIG. 1A). The MVN 100 has a body consisting of an impervious Medium 101. In certain embodiments, the Medium 101 could be plastic (including Polyvinyl chloride ("PVC")), rubber, or metal. The MVN 100 has: (a) a front end having an Outer Surface 113 and a Manifold Nipple 115 which protrudes from the Outer Surface 113 of the MVN 100; and (b) a back end having a Bottom Edge 116. Thus, the Bottom Edge 116 is distal from the Outer Surface 113. The MVN 100 also has a Vertical Surface 117. The Vertical Surface 117 is smooth and uniform. FIG. 1A further shows a plane $\overline{AB}$ approximately half-way between the Bottom Edge 116 and the Outer Surface 113.

Each Choke 103 is a small opening extending through the body of the MVN 100. Thus, because each Choke 103 is both: (a) more narrow that the diameter of the MVN 100 (and of the pipe or other conduit into which the MVN is inserted) at the Bottom Edge 116; and (b) more narrow than the diameter of the MVN 100 at the Outer Surface 113, each Choke 103 creates a Venturi effect (i.e., a reduction in fluid pressure) between: (a) the distal front and back ends of the MVN 100; and (b) the Choke 103. In one embodiment, the Manifold 111 is generally centrally located within the MVN 100 in order to ensure a uniform distribution of gas or liquid to each of the Chokes 103.

Figure 1B:
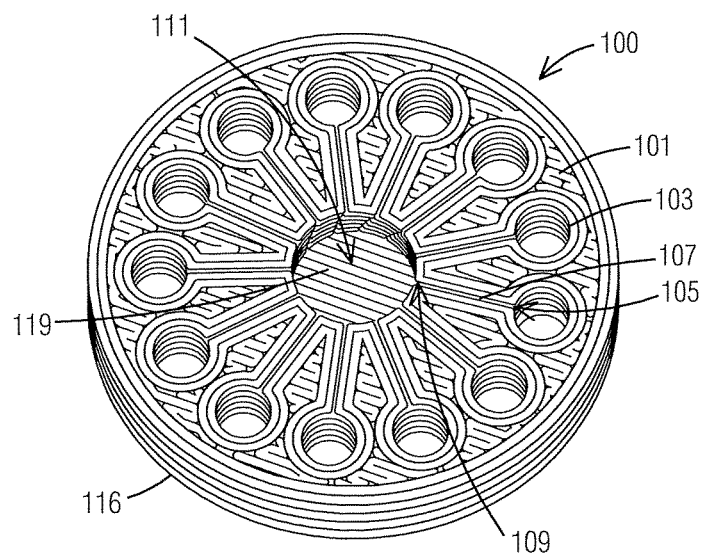
FIG. 1B is a perspective cutaway view of an MVN taken along the plane $\overline{AB}$ shown in FIG. 1A.

FIG. 1B is a perspective cutaway view of an MVN 100 taken along the plane $\overline{AB}$ shown in FIG. 1A having a plurality of Chokes 103, a Manifold 111, a body consisting of an impervious Medium 101 and a Bottom Edge 116. The Manifold 111 is a cavity and has a Manifold Nipple 115 (not shown in FIG. 1B) and terminates in a Manifold Back 119 distal from the Manifold Nipple 115. The Manifold 111 has at least one Manifold Inlet 109 connected to a Manifold Channel 107. In the embodiment shown in FIGS. 1A and 1B, the MVN 100 has a plurality of Manifold Inlets 109. The Manifold Channel 107 has a Manifold Outlet 105 distal from the Manifold Inlet 109. The Manifold Inlet 109 is connected to a Choke 103. Thus, gas or liquid is allowed to freely pass from the Manifold 111 through the Manifold Inlet 109 through the Manifold Channel 107 through the Manifold Outlet 105 and into the Choke 103. A hose, tube, pipe or other piping (not shown in FIG. 1A) dimensionally sized to mate with the Manifold Nipple 115 is used to connect the Manifold 111 to a first gas or a liquid. The gas or liquid could be pressurized or could be at standard atmospheric pressure. The first gas or liquid could be any number of substances depending on the application for which the MVN is being used. A second gas or liquid is passed through the pipe or other conduit which then flows through the Chokes 103.

Common first gasses/liquids and their corresponding applications include:

| Gas(es)/Liquids | MVN Application |
| --- | --- |
| Air or Oxygen Gas | Aeration, oxygenation and atomization (e.g., dispersing perfume or spray paint) |
| Ozone | Ozonation of a liquid; ozonating water; ozonating blood |
| Carbon Dioxide Gas | Carbonating a liquid |
| Fluorine Gas | Fluorinating a liquid; water fluoridation |
| Chlorine Gas | Chlorinating a liquid; water chlorination |
| Flammable Gas | Inspirating air |
| Fuel (e.g., Gasoline or Diesel) | Carburetor |

Thus, when a first gas or liquid is connected to the Manifold 111 and a second gas or liquid is connected to the MVN 100 and passes through the Choke 103, the Venturi effect caused within the Choke 103 will cause the first gas or liquid and the second gas or liquid to mix together.

The MVN 100 shown in FIGS. 1A and 1B is made using a three-dimensional ("3D") printer. Thus, the Medium 101 is shown as consisting of "rows" of material as is common for 3D printed articles. 3D printing the MVN 100 allows for the MVN 100 to be precision constructed; particularly with respect to the various Manifold Inlets 109, Manifold Channels 107 and Manifold Outlets 105 (depending on the size of which traditional casting/drilling methods could prove cost-prohibitive or impossible).

Figure 2A:
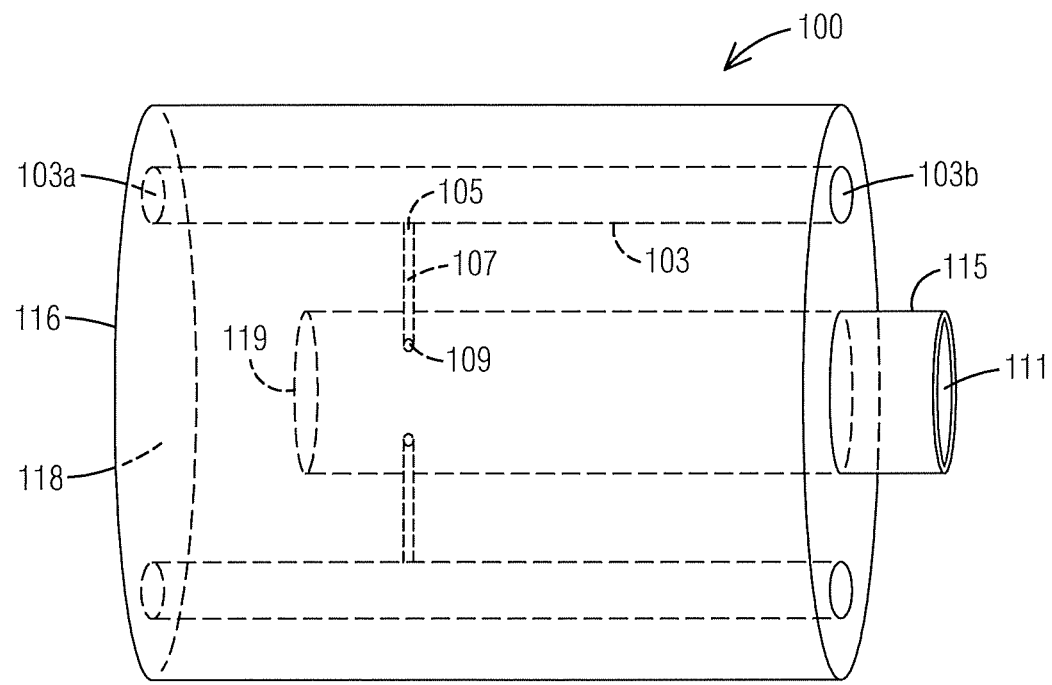
FIG. 2A is a stylized side view of a MVN having at least one choke.

FIG. 2A is a stylized side view of a MVN 100 having at least one Choke 103, each Choke 103 having a Choke Inlet 103a and a Choke Outlet 103b. The MVN 100 also has a Manifold 111 having a Manifold Nipple 115 and a distal Manifold Back 119. The Manifold 111 is connected to the Choke 103 by a Manifold Channel 107, each Manifold Channel 107 having a Manifold Inlet 109 and a Manifold Outlet 105. The MVN 100 further has a Bottom Surface 118 with a Bottom Edge 116 distal from the Manifold Nipple 115.

Figure 2B:
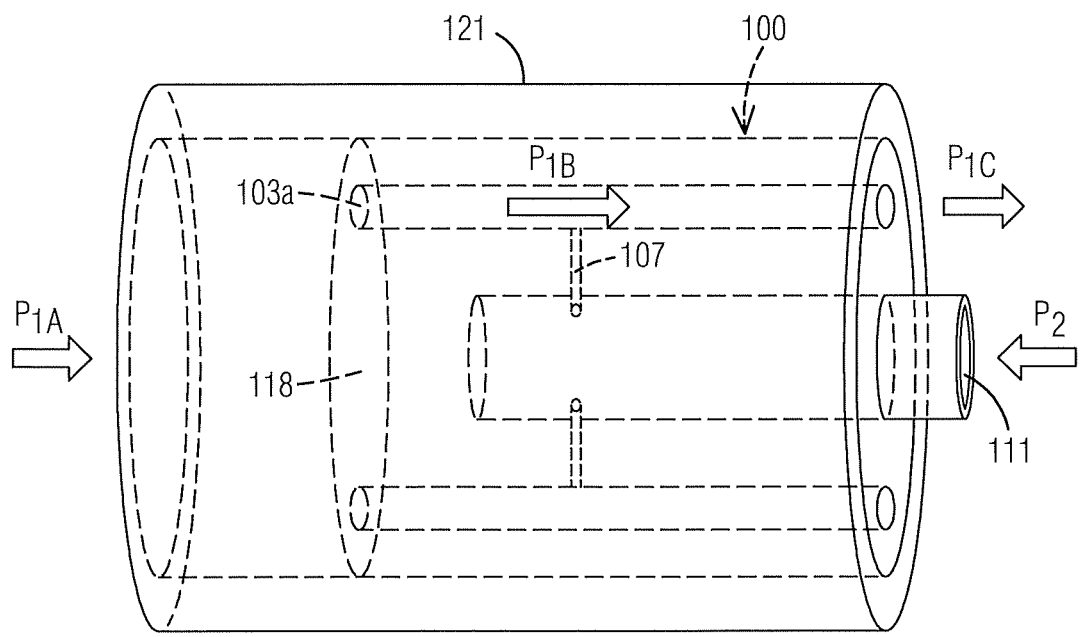
FIG. 2B is a stylized side view of an MVN which has been inserted into an outer pipe.

FIG. 2B is a stylized side view of an MVN 100 which has been inserted into a Pipe 121. In the embodiment shown in FIG. 2B, a fluid (such as water) is passed through the Pipe 121 at an Initial Pressure of $P_{1A}$. As this fluid encounters the Choke Inlets 103a, the fluid undergoes a Venturi effect, resulting in a changed static fluid pressure within the Choke 103, i.e., the Choke Pressure of $P_{1B}$. In the embodiment shown in FIG. 2B, a gas (such as air) is passed through the Manifold 111 at a Second Pressure of $P_2$. Thus, the gas is drawn through each Manifold Channel 107 and mixes with the fluid in the Chokes 103. The gas/fluid mixture then exits the Chokes 103 through their Choke Outlets 103b at a Final Pressure Pic.

Figure 3A:
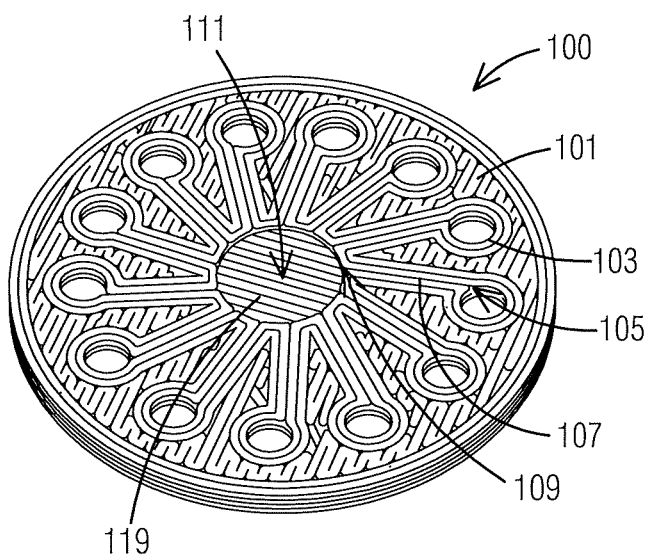
FIGS. 3A through 3L depict sequential perspective views of the process of manufacturing a MVN using 3D printing.

FIGS. 3A through 3L depict sequential perspective views of the process of manufacturing a MVN 100 using 3D printing. As can be seen in FIG. 3A, a MVN 100 is at an early stage of 3D printing with only the initial "layers" of Medium 101 having been 3D printed. The MVN 100 has the beginnings of a centrally located Manifold 111 with a Manifold Back 119 and a plurality of Manifold Inlets 109, each of which is connected to a Manifold Channel 107 with a Manifold Outlet 105 distal from the Manifold Inlet 109. Each Manifold Outlet 105 is connected to a Choke 103.

Figure 3B:
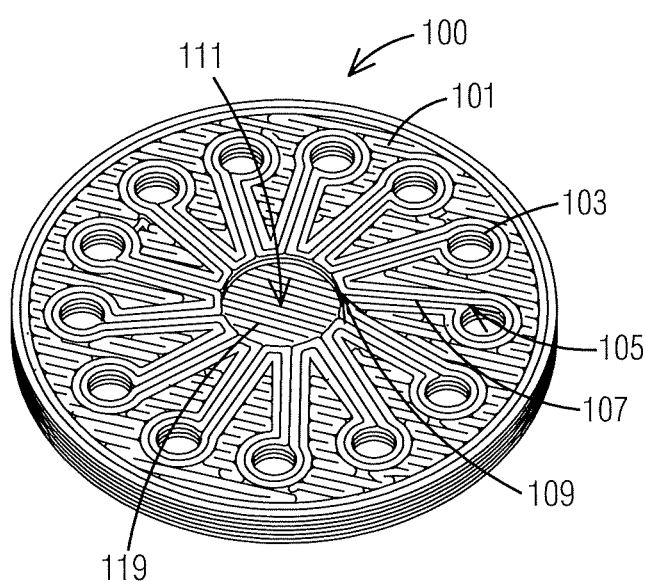
Figure 3C:
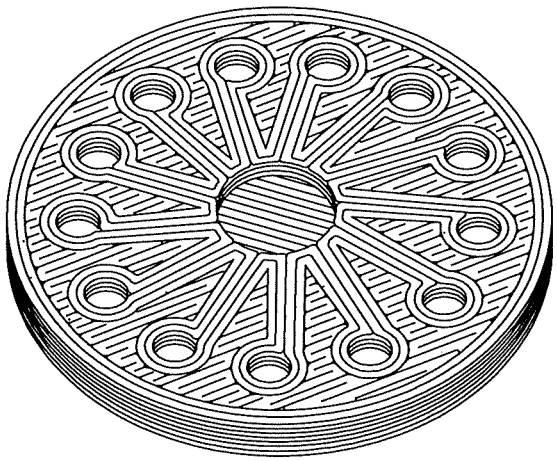
Figure 3D:
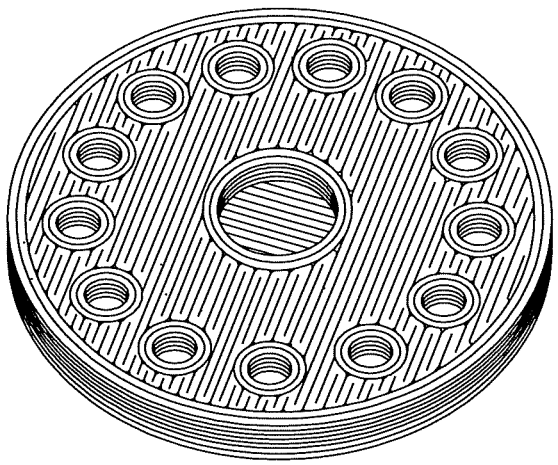
Figure 3E:
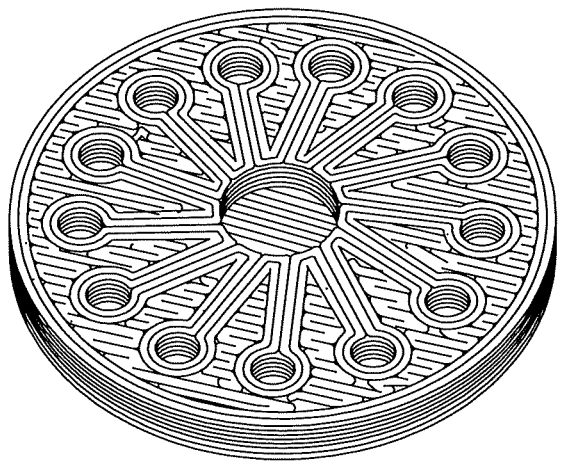
Figure 3F:
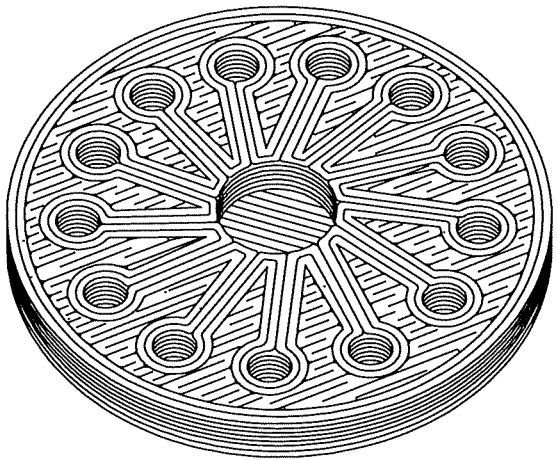
Figure 3G:
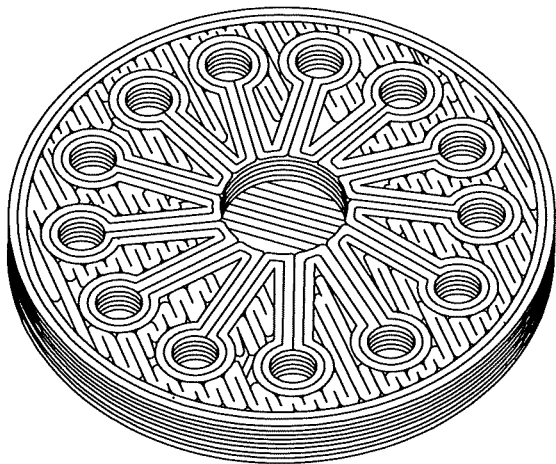
Figure 3H:
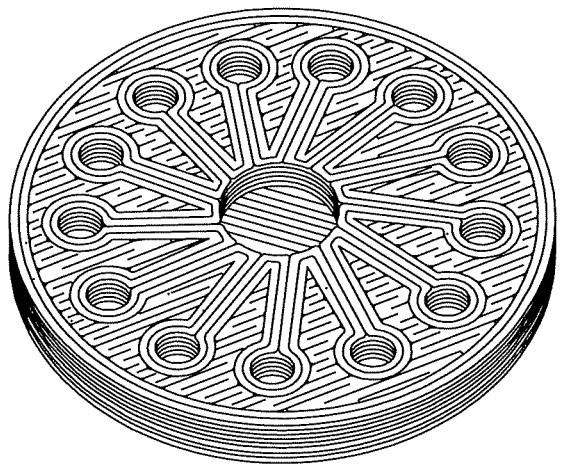
Figure 3I:
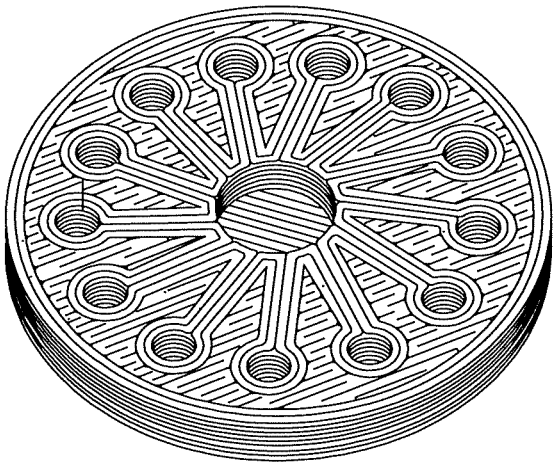
Figure 3J:
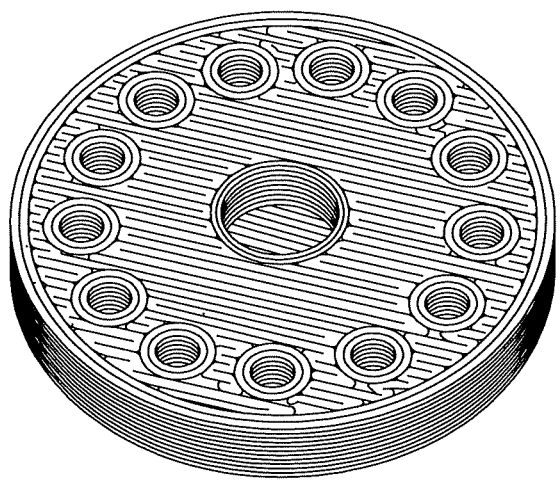
Figure 3K:
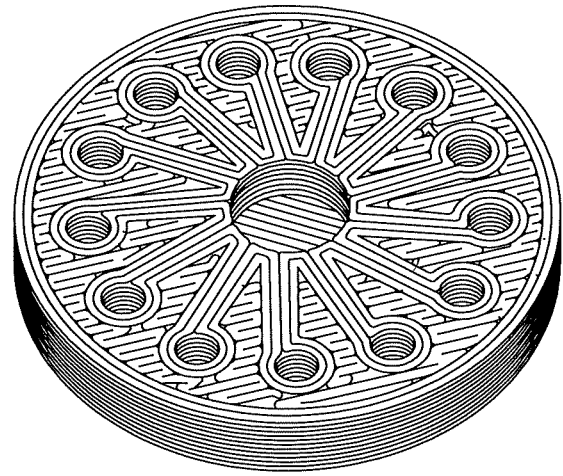
Figure 3L:
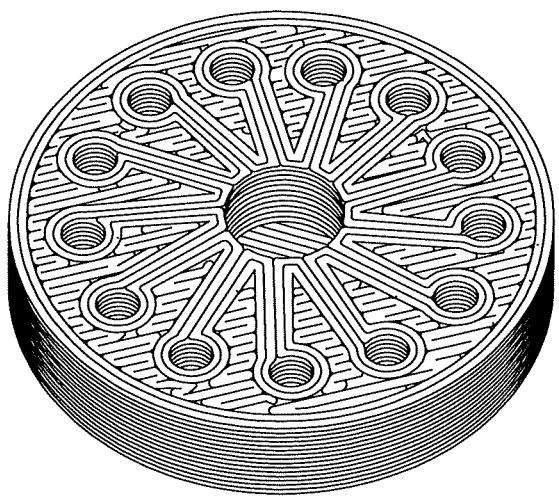

FIG. 3B shows the same MVN 100 from FIG. 3A with several additional "layers" of Medium 101 having been 3D printed. As can be seen in FIG. 3B, the central Manifold 111 and each of the Chokes 103 has been further formed in the same positions. However, each of the Manifold Outlets 105, Manifold Channels 107 and Manifold Inlets 109 from FIG. 3A have been fully formed and "capped off," while new Manifold Outlets 105, Manifold Channels 107 and Manifold Inlets 109 have been partially formed which are "rotated" with respect to an axis defined by the Manifold 111. This rotational process is cyclically repeated throughout the 3D layering process as shown in the remaining FIGS. 3C through 3L. In particular, FIG. 3D shows a "capping" layer in which all of the Manifold Outlets 105, Manifold Channels 107 and Manifold Inlets 109 in a particular layer have been "capped". Thus, in the embodiment shown in FIGS. 3A through 3L, the plurality of Manifold Outlets 105, Manifold Channels 107 and Manifold Inlets 109 form a generally helical structure.

Figure 4A:
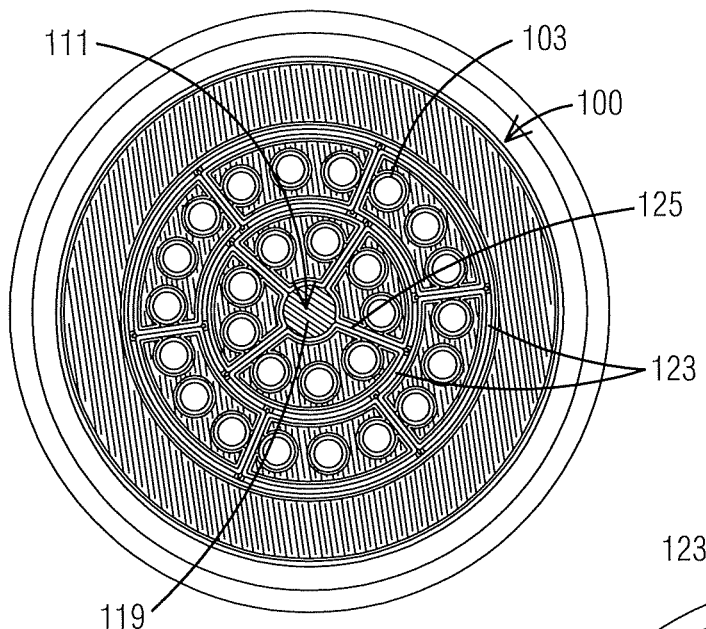
FIG. 4A through FIG. 4C depict sequential perspective views of the process of manufacturing an alternative embodiment of an MVN using 3D printing.
Figure 4B:
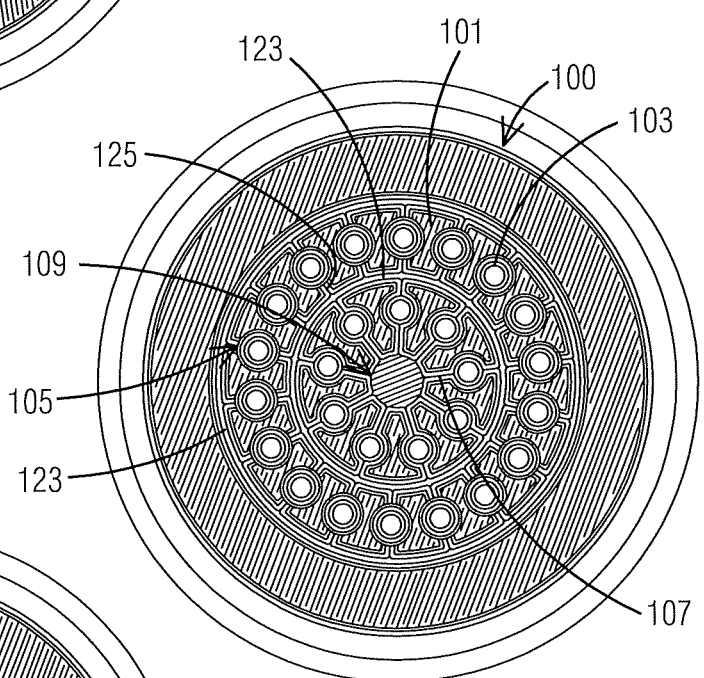
Figure 4C:
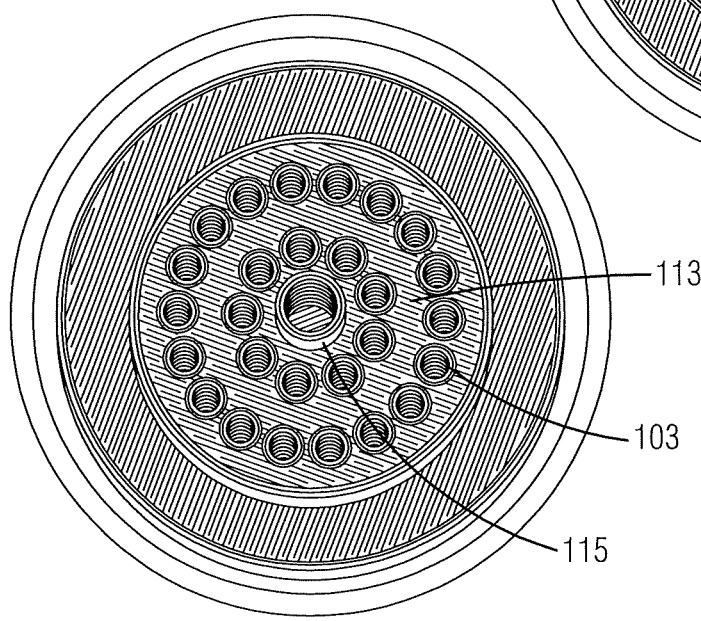

FIG. 4A through FIG. 4C depict sequential perspective views of the process of manufacturing an alternative embodiment of an MVN 100 using 3D printing. In FIG. 4A, an MVN 100 is shown having a plurality of Chokes 103 which are located in two concentric groupings about a central Manifold 111 (which Manifold 111 has a Manifold Back 119). The Chokes 103 are connected to the Manifold 111 by a system of concentric Manifold Rings 123 and radial Manifold Passages 125. The innermost Manifold Ring 125 is connected to the Manifold 111 by at least one Manifold Passage 125. The outermost Manifold Ring 123 is connected to the innermost Manifold Ring 123 by at least one Manifold Passage 125.

In FIG. 4B, the same MVN 100 is sown from FIG. 4A after several additional layers of Medium 101 have been 3D printed. In FIG. 4B, the same structure of Manifold Inlets 109, Manifold Channels 107 and Manifold Outlets 105 as previously disclosed herein may be seen connecting each Choke 103 to a nearby Manifold Ring 123. In the design shown in FIG. 4B, however, each Choke 103 has two Manifold Outlets 105 since the Manifold Channels 107 are used to help further connect the Manifold Rings 123 to the Manifold 111.

FIG. 4C shows the MVN 100 from FIGS. 4A and 4B after the final layers of Medium 101 have been applied thereto. As can be seen in FIG. 4C, the MVN 100 has a plurality of finished Chokes 103 and an Outer Surface 113 with a Manifold Nipple 115 extending outwards from such Outer Surface 113. The Manifold Nipple 115 shown in FIG. 4C is a "male" attachment means. However, "female" attachment means such as an interior hole dimensionally sized to accommodate a pipe or tube could also be used.

Figure 5:
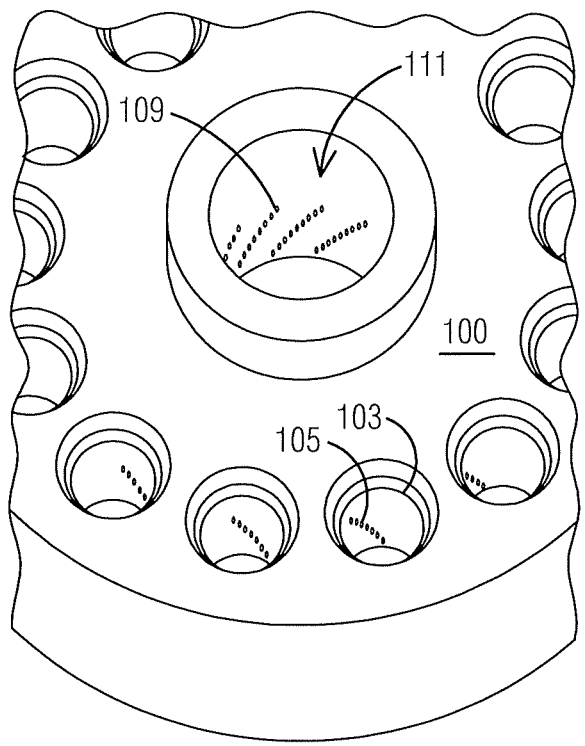
FIG. 5 is an enlargement of a MVN showing enlarged details of a finished choke and manifold.

FIG. 5 is an enlargement of a MVN 100 showing enlarged details of a finished Choke 103 and Manifold 111. As can be seen in this enlarged detail, within the Choke 103 there are a plurality of helically distributed Manifold Outlets 105. As can also be seen in this enlarged detail, within the Manifold 111 there are a plurality of helically distributed Manifold Inlets 109. A method of constructing an MVN 100 resulting in such helically distributed Manifold Outlets 105 and Manifold Inlets 109 is described above in FIGS. 3A through 3L.

Figure 6:
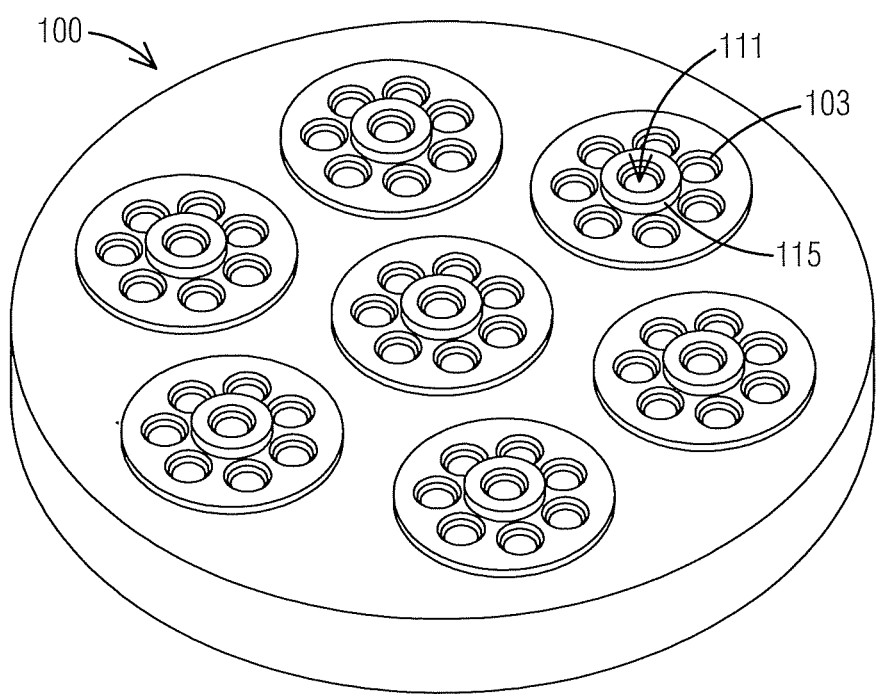
FIG. 6 shows a top perspective view of a MVN having a plurality of manifolds each having a manifold nipple and a plurality of chokes.

FIG. 6 shows a top perspective view of a MVN 100 having a plurality of Manifolds 111 each having a Manifold Nipple 115 and a plurality of Chokes 103. In essence, this is like having a plurality of MVNs 100 surrounded by Medium 101. As noted above, each of the Manifolds 111 could be connected to a single gas or liquid source or be connected to separate gas or liquid sources allowing the MVN 100 to effectively "mix" and simultaneously dissolve different compounds into the primary gas or liquid.

Figure 7A:
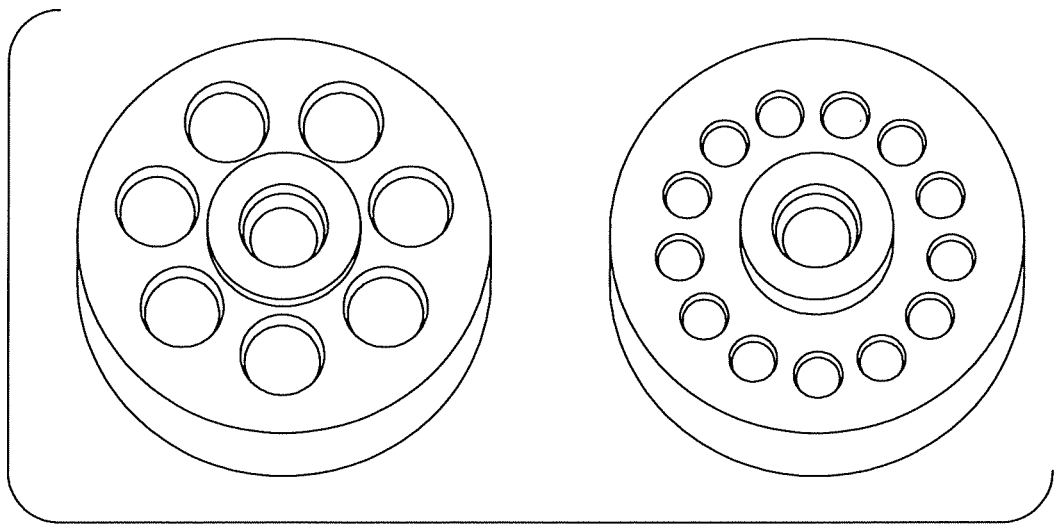
FIG. 7A shows top perspective views of two MVNs having differently sized chokes.
Figure 7B:
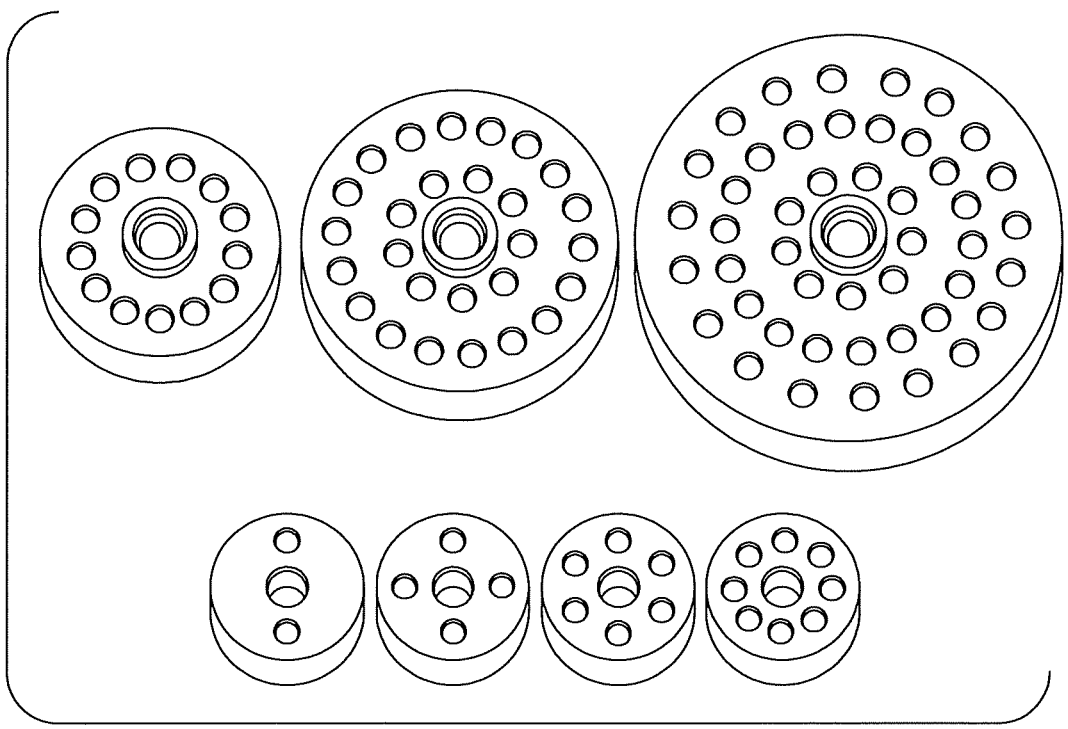
FIG. 7B shows top perspective views of seven different sizes of MVNs each having a different number/distribution pattern of chokes.

FIG. 7A shows top perspective views of two MVNs 100 having differently sized Chokes 103. The size of the Choke 103 can be adjusted based on the desired flow of fluid or gas through the Chokes 103 and the desired ratio of mixing the two fluids or gases together within the Chokes 103. FIG. 7B shows top perspective views of seven different sizes of MVNs 100 each having a different number/distribution pattern of Chokes 103. As can be seen in FIG. 7B, the four leftmost MVNs 100 do not have a Manifold Nipple 115 but instead simply have an opening in the Manifold 111 which is flush with the Outer Surface 113. This creates a "female" opening for inserting a pipe or a hose into the Manifold 111. In certain embodiments, threading could be used in either such a "female" opening or in a Manifold Nipple 115 to further engage the Manifold 111 to a pipe or hose.

It is to be understood that while a preferred embodiment of the invention is illustrated, it is not to be limited to the specific form or arrangement of parts herein described and shown. It was be apparent to those skilled in the art that various changes may be made without departing from the scope of the invention and the invention is not to be considered limited to what is shown and described in the specification and drawings.

Having thus described my invention, I claim:

1. A multiple-Venturi nozzle comprising:
   (a) a generally cylindrical body having a generally flat bottom surface and a generally flat distal outer surface and a generally arcuate vertical surface parallel to the bottom and outer surfaces;
   (b) a plurality of chokes generally perpendicular to the bottom and outer surfaces, each of said chokes extending through the body and having a choke inlet and a choke outlet;
   (c) a manifold extending from the outer surface partially into the body; and
   (d) a plurality of manifold channels connecting the manifold to each choke, each of said manifold channels:
      (i) being generally perpendicular to a corresponding choke;
      (ii) having a manifold outlet and a distal manifold inlet; and
      (iii) being offset in a helical distribution from other manifold outlets corresponding to the corresponding choke.

2. The multiple-Venturi nozzle of claim 1 further comprising:
   said multiple-Venturi nozzle being constructed by means of:
   (i) 3D printing said multiple-Venturi nozzle in layers of a 3D printing material, each layer having a thickness; and
   (ii) each manifold channel which corresponds to a given choke being offset from one another by the thickness of at least one 3D printed layer of material.

3. The multiple-Venturi nozzle of claim 1 further comprising:
   said manifold being generally central with respect to the body; and
   said manifold having a manifold nipple.

4. The multiple-Venturi nozzle of claim 3 further comprising:
   each of said chokes are evenly distributed radially about an axis defined by the manifold.

5. The multiple-Venturi nozzle of claim 3 further comprising:
   each of said chokes are evenly distributed radially about an axis defined by the manifold.

6. The multiple-Venturi nozzle of claim 1 further comprising:
   said manifold being generally central with respect to the body; and
   said manifold having a manifold nipple.

7. A multiple-Venturi nozzle comprising:
   (a) a generally cylindrical body having a generally flat bottom surface and a generally flat distal outer surface and a generally arcuate vertical surface parallel to the bottom and outer surfaces;
   (b) a plurality of chokes generally perpendicular to the bottom and outer surfaces, each of said chokes extending through the body and having a choke inlet and a choke outlet;
   (c) a manifold extending from the outer surface partially into the body; and
   (d) a plurality of manifold channels connecting the manifold to each choke, each of said manifold channels having a manifold outlet and a distal manifold inlet.

8. The multiple-Venturi nozzle of claim 7 further comprising:
   said multiple-Venturi nozzle being constructed by means of:
   (ii) 3D printing said multiple-Venturi nozzle in layers of a 3D printing material, each layer having a thickness.

\* \* \* \* \*